April 7, 1970   R. A. WILLIAMS   3,505,635
PYROTECHNIC DETONATOR CIRCUIT TEST PROBE
Filed Aug. 14, 1968   2 Sheets-Sheet 1

INVENTOR.
Robert A. Williams
BY
Wofford & Felsman
ATTORNEYS

INVENTOR
Robert A. Williams
BY
Wofford & Felsman
ATTORNEYS

United States Patent Office 3,505,635
Patented Apr. 7, 1970

3,505,635
PYROTECHNIC DETONATOR CIRCUIT TEST PROBE
Robert A. Williams, Fort Worth, Tex., assignor to Williams Instruments, Inc., Fort Worth, Tex.
Continuation-in-part of application Ser. No. 621,874, Mar. 9, 1967. This application Aug. 14, 1968, Ser. No. 756,085
Int. Cl. H01r 13/24, 17/18, 33/10
U.S. Cl. 339—91                                                6 Claims

ABSTRACT OF THE DISCLOSURE

A test probe apparatus having electrical contacts for detecting spurious electrical energy in pyrotechnic cartridge wells that in operation carry an explosive for discharging weapons, the apparatus including cam operated retainers for rapid connection and removal from the well.

---

This application is a continuation in part of application Ser. No. 621,874, filed Mar. 9, 1967, and now abandoned.

BACKGROUND OF THE INVENTION

When slow speed military aircraft were exclusively utilized, gravity expelled bombs or equivalent from them. With the increased speed of present day military aircraft, it is essential in the interest of safety that bombs be more forcibly ejected than is possible relaying on gravity. Consequently, pyrotechnic cartridges located in wells and making electrical connection with a detonator circuit have been found effective in safely ejecting bombs from high speed aircraft. When the detonator circuit is energized, the cartridge emits high pressure gas which may, for example, release a latching device and immediately thereafter eject a bomb. Unfortunately, such devices have proven dangerous while arming aircraft previous to missions. Premature ejection of a bomb occurs upon inserting one of the cartridges, into a well in which the detonator circuit has been accidently or inadvertently energized. Accordingly, it is essential that the detonator circuit of such devices be tested for the occurrence of electrical energy prior to arming the aircraft.

Test probes have been developed in which two electrical contacts are urged into engagement with two mating contacts in the associated detonator circuit. To enable testing over an extended time period, threads were formed on the test probes to mate with threads formed in the cartridge well for retaining the probe. Such arrangements have proven disadvantageous, due principally to the time delay involved in making and breaking threaded connections. And yet, it is essential that test probes have means to enable the extensive testing sometimes required. One of my purpose is to overcome disadvantages found in prior test probes by providing means for enabling more rapid, but reliable, connection and removal from the associated detonator circuit.

Another purpose is to resiliently mount the electrical contacts to insure positive engagement with the generally stationary contacts in the cartridge well.

It is advantageous that the test probe have means that emphatically signals the user when the locking and unlocking positions are reached by the cam operating, axially movable sleeve. I developed a groove and groove follower arrangement that enable the user to feel both positions and unquestionably know immediately the position of the probe.

Pyrotechnic test probes must have that degree of ruggedness which leads to fail-safe reliability, since safety is of paramount importance. Hence, I originated a test probe in which the electrical conductors are secured by insulation moulded inside the probe.

In some instances the cam retainer elements should be rotated, and thus I provide a pin and slot arrangement between the cam operating sleeve and the shell which holds the cam retainers such that rotation of the sleeve rotates the shell.

To insure prevention of short circuits between the probe and the cartridge well, I originated a structure by which inner and outer contacts on the probe are insulated from each other by a sleeve of insulation, and further, the remaining entire end portion of the body of the probe, which is normally made of metal, is encompassed with an insulating covering. In addition, the construction of the inner and outer contactor, which should be resiliently mounted for best results, improves the reliability of the probe.

DESCRIPTION OF THE PREFERRED EMBODIMENTS

Figure 1:
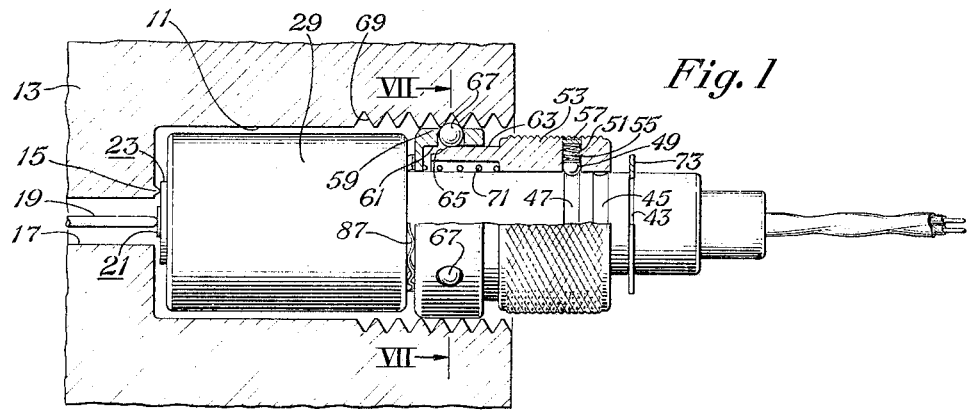
FIG. 1 is a fragmentary side elevational view, partially in section, showing a pyrotechnic detonator circuit test probe constructed in accordance with the principles of my invention and inserted into a pyrotechnic cartridge well.

The numeral 11 in the drawing designates a well into which may be inserted a pyrotechnic cartridge of the type used to eject bombs or equivalent. The material 13 in which the well is formed is electrically conductive in this instance, having one portion 15 in the form of a suitable electrical contact. A second electrical contact 19 is disposed centrally in the aperture 17.

Figure 2:
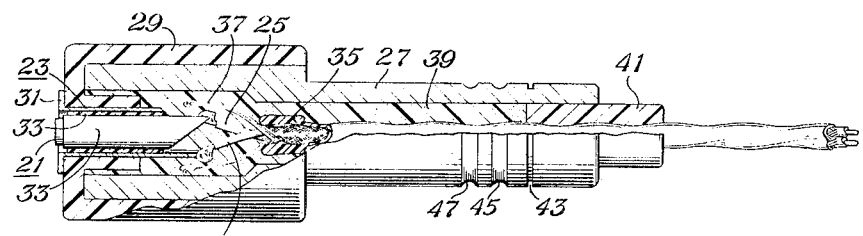
FIG. 2 is a fragmentary side elevational view showing the internal construction of portions of the pyrotechnic test probe of FIG. 1.

A pair of electrical contacts, referred to as an inner contact 21 and an outer contact 23, are exposed on one end portion of the test probe and are connected with two insulated electrical conductors 25, 26 (see FIGS. 2) which extend through the body 27 of the test probe as shown in FIG. 2. The outer contact 23 has a cylindrical portion 30 secured in a depression of an enlarged insulated casing 29 that encloses the end portion of the probe. A flange 31 forms the exposed portion of the outer contact. An insulated sleeve separates the outer contact 23 from the inner contact 21. The body 27, which may be electrically conductive, is filled with an insulating material 39 which helps secure the electrical conductors 25, 26. The inner conductor 21 may also have a cylindrical form and the conductors 25, 26 are connected to the interior, preferably truncated, ends of respective ones of the contacts. Outer insulating material 35 covering the electrical conductors 25, 26 covers a fibrous metal inner core 37 which also surrounds the individual conductors 25, 26. The fibrous material is preferably unraveled at its end portion and spread within the insulating material 39. A plug 41 is used to form the end of the test probe opposite the contacts 21, 23. Adjacent this plug the body 27 has a snap ring groove and in this instance two larger axially spaced grooves 45, 47.

These grooves are adapted to receive a groove follower 49 placed in an aperture 51 of a movable sleeve 53. The groove follower 49 is biased inward in this instance by a compression spring 55, one end of which engages a small cover plate 57 secured in an upper portion of the aperture by suitable means. Thus, the groove follower 49 and grooves 45, 47 together define means for interrupting the sleeve movement to define two axial positions of the sleeve relative to the body 27.

Disposed at an approximate mid-region of the body is a shell 59 which has an interior annular surface 61 adapted to slide axially over an exterior annular surface 63 formed on sleeve 53. The exterior annular surface 63 of the sleeve is in effect a cam surface having one portion 65 which engages a cam follower 67 (here a sphere) allowing it to assume a position interior of the outer peripheral surface of the shell 59. The outer annular surface 63 is adapted to urge the cam follower 67 into engagement with the threads 69 formed in the cartridge well 11.

Figure 7:
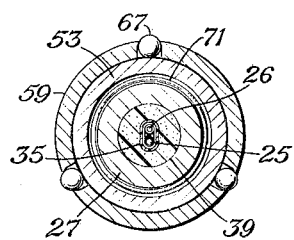
FIG. 7 is a cross sectional view as seen looking along the lines VII—VII of FIG. 1.

As shown in FIG. 7, it is preferable that three equally spaced cam followers 67 be disposed around the shell 59 for centralizing and stabilizing the shell and test probe within the cartridge well. The previously described annular grooves 45, 47 are positioned such that with the groove follower 49 in the rearward groove 45, the cam follower 67 engages the lower portion 65 of the exterior annular surface 63. Alternatively, with the groove follower 49 positioned in the forward annular groove 47, the cam follower and retainer element 67 engages the enlarged annular surface 63 until the cam follower 67 is urged into engagement with the threads 69 of the cartridge well.

Biasing means such as compression spring 71 engages opposed shoulders on respectively the sleeve 53 and the shell 59 such that a lesser force is required to retract the sleeve than to extend it to the position shown in FIG. 1. Preferably about five pounds of force is required to move the sleeve forward to the position shown in FIG. 1 and the compression spring 71 sized such that only two pounds of force is required to retract it. A snap ring 73 is provided in the groove 43 to lessen the chances for inadvertent or accidental disassembly of the sleeve 53 from the body 27.

In the interest of providing a better electrical contact, the inner contact 21 consists of an assembly which may include an outer housing 75 having a base 77 secured therein by suitable means such as tack welding. The contact portion 79 is urged outward into engagement with the shoulder 81 of the housing by means of the compression spring 82, which is also tack welded or wring fitted on shoulders 80, 82 provided respectively on contact portion 79 and base 77. For stabilization a piston 83 may be formed on the contact portion 79 to be received by a cylinder 85 formed in the base.

Better electrical connection is provided if the outer contact 23 is resiliently movable with respect to the body 27. This result may be achieved by mounting the enlarged casing 29 for axial movement on the body 27 and providing biasing means, such as undulating washer 87 shown in FIG. 1, between the rearward radial shoulder of the enlarged casing and a forward radial shoulder of the shell 59.

Figure 4:
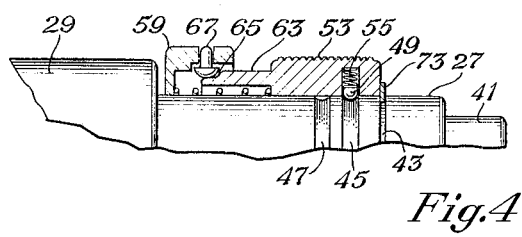
FIG. 4 is a fragmentary side elevational view, partially in section, of a modified form of a pyrotechnic detonator circuit test probe.

It is not essential that the cam follower 67 have the form of a sphere and a suitable modified form is shown in FIG. 4. This cam follower is in the form of a rivet which extends from the shell 59 and is activated by the previously described cam surfaces on the movable sleeve 53 in the same manner as the embodiment shown in FIG. 1.

Figure 5:
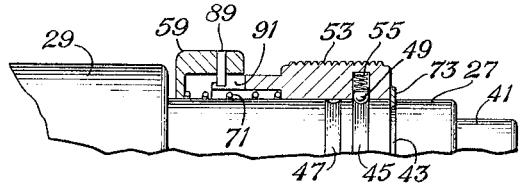
FIG. 5 is a side elevational view, partially in section, of another modified form of pyrotechnic detonator circuit test probe.

It is advantageous in some instances that the cam follower and retainer element 67 be rotatable such that the force between the electrical contacts 21, 23 of the test probe and the contacts 15, 19 of the cartridge well be more forcibly engaged than is achieved by simple inward manual movement of the test probe. I therefore in the embodiment shown in FIG. 5 provide a pin 89 in the shell 59 which extends into an axial slot 91 formed through the inward cylindrical end of the movable sleeve 53. Thus, when the movable sleeve 53 is rotated, the engagement of the pin 89 with the edges of the axial groove 91 rotates the shell 59, causing similar rotation of the cam follower 67 in the threaded portion of the cartridge well. The resulting mechanical advantage enables more forceful engagement of the contact points.

Figure 8:
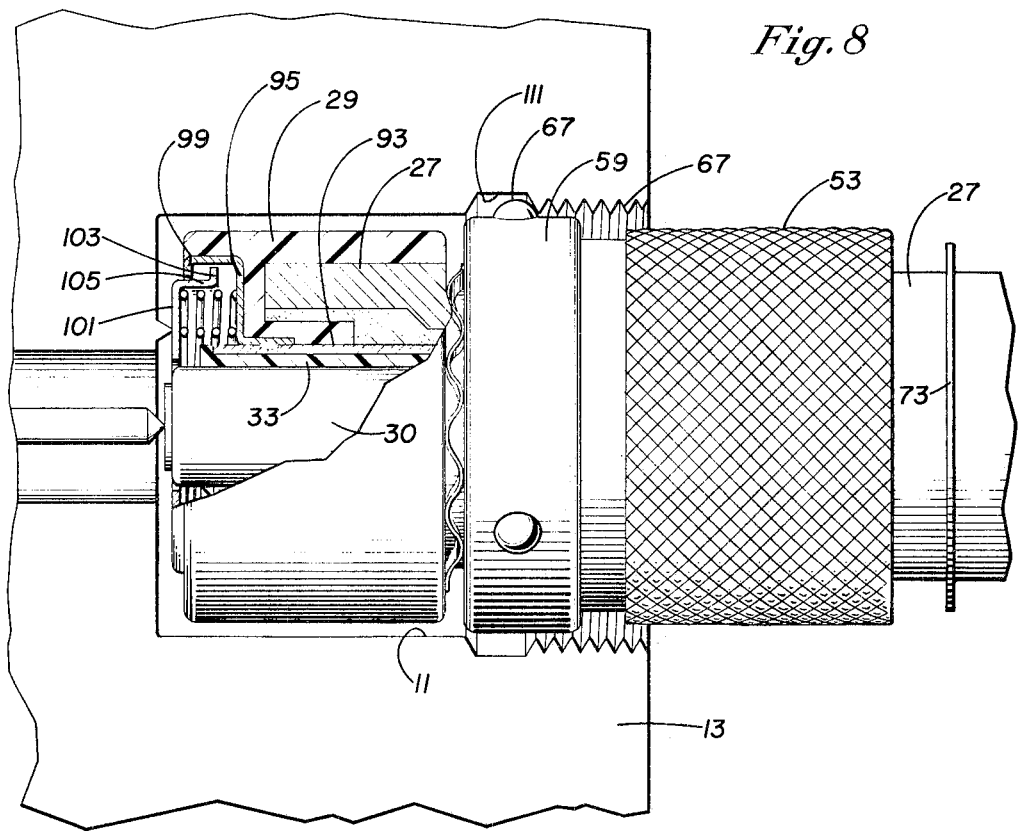
FIG. 8 is a fragmentary side elevational view, partially in section, of yet another form of test probe, which has an improved form of outer resilient electrical contact.

In FIG. 8 is shown a test probe having improved resilient mounting means for the outer electrical contact. The body 27 has a movable sleeve 53 that actuates the cam follower and retainer elements 67 held captive by a shell 59, as in the other embodiments. Further, an undulating washer 87 separates the shell 59 and the enlarged, insulating casing 29.

The outer cylindrical portion 30 of the inner contact 23 is separated from the stationary core 93 of the outer contact by an insulating sleeve 33. Extending radially outward from the core 93 is a stationary transverse face 95 having an axial portion 97 with a downwardly protruding lip 99.

A movable plate portion 101 of the outer contact is confined by its flange 103 extending outward from an axial portion 105 into confrontation with the lip 99 of the stationary transverse face 95. A compression means that in this instance is in the form of two coaxial compression springs 107, 109 extends between the stationary transverse face 95 and the movable plate portion 101. Hence, positive communication occurs between the outer contact of the probe and the fixed contact 15 of the cartridge well 11.

As may be seen in the FIG. 8 embodiment, the retainer elements 67 engage a thread relief groove 111 in the cartridge well instead of the threads, although it is practicable to engage either.

Figure 9:
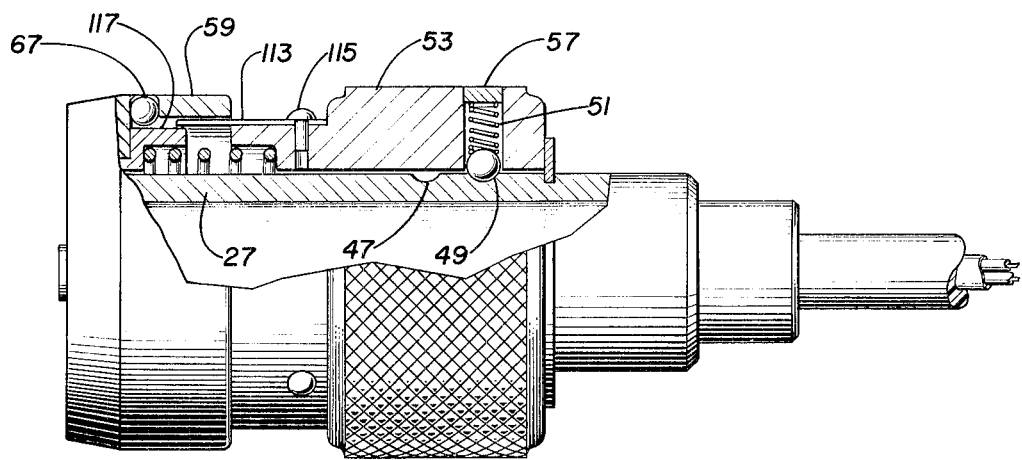
FIG. 9 shows in fragmentary side elevation an additional form of test probe.

Referring to FIG. 9, this probe has a shell 59 positioned at the forward end of the body 27. The movable sleeve 53 has a thin cylinder 113 mounted by a rivet 115 to its forward end to slip inside the shell 59 above surface 117, which assists in forcing the retainer 67 outward when engaged by the cylinder. The machining tolerances are less critical relative to forming the cylinder 113 when compared to those of other cam surfaces shown.

The cylinder is thin walled (preferably from about .006–.010 inch thick).

In operation the test probe is inserted in the pyrotechnic cartridge well 11 so that the inner and outer contacts 21, 23 engage the contacts 15, 19 in the bottom of the well. If an instantaneous test for electrical energy in the detonator circuit (not shown) is all that is required, the sleeve 53 is not pushed forward, and the groove follower 49 remains in the rearward groove 45. To secure the test probe in the well the sleeve 53 is urged forward until the groove follower 49 reaches the forward groove 47, resulting in outward movement of the cam follower and retainer elements 67 into engagement with the threads 69 of the cartridge well 11. With the embodiment shown in FIG. 5 the sleeve 53 may be rotated to simultaneously rotate the shell 59 and hence the cam followers 67. Consequently, the contacts 21, 23 of the test probe are forcibly urged against the contacts 15, 19 of the cartridge well. Removal of the test probe is effected by rearward movement of the sleeve 53 until the cam followers 67 are free to retract from engagement with threads 69. Thus, the test probe may be rapidly retracted from the cartridge well.

Figure 3:
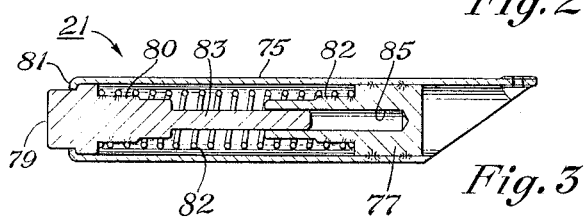
FIG. 3 is a side elevational view in longitudinal section of the inner electrical contact assembly partially visible in FIGS. 1 and 2.
Figure 6:
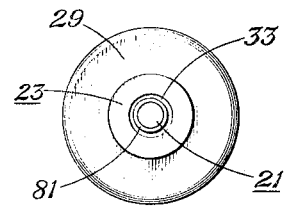
FIG. 6 is an end view of the test probe illustrated in FIGS. 1 and 2.

The utilization of the contact assembly shown in FIG. 3 minimizes electrical resistance since current may easily flow through contact portion 79 the tack wells, the spring 82 and the base 77. Reliability is thereby increased by this feature of the invention.

While I have shown my invention in only a few of its forms, it should be apparent that it is not so limited but is susceptible to various changes and modifications without departing from the spirit thereof.

I claim:

1. A pyrotechnic detonator circuit test probe for insertion into a pyrotechnic cartridge well, said probe comprising:
   a tubular body;
   a pair of electrical contacts secured to one end of the body;
   two electrical conductors communicating axially with respective conductors through the body from its opposite end;
   insulating material moulding said conductors inside a substantial length of the tubular body;
   axial compression means connected with the contacts to enable variation in the axial placement of the body within the cartridge well while maintaining satisfactory electrical connection;
   a shell secured to the exterior of the tubular body and having at least one radial aperture;
   a cam follower and retainer element reciprocably mounted within said aperture to move outward selectively beyond the outer periphery of said shell; and
   a movable sleeve reciprocably mounted on the exterior of the body and having a cam surface portion exterior of the body and interior of the shell to selectively engage the cam follower and retainer element for urging it outward beyond the periphery of the shell.

2. A pyrotechnic detonator circuit test probe for insertion into a pyrotechnic cartridge well, said probe comprising:
   a tubular body;
   a pair of electrical contacts secured to one end of the body;
   two electrical conductors communicating with respective contacts;
   a shell secured to the exterior of the tubular body and having at least one radial aperture;
   a cam follower and retainer element reciprocably mounted within said aperture to move outward selectively beyond the outer periphery of said shell;
   a movable sleeve reciprocably mounted on the exterior of the body and having a cam surface portion exterior of the body and interior of the shell to selectively engage the cam follower and retainer element for urging it outward beyond the periphery of the shell;
   said body having two axially spaced grooves beneath the movable sleeve;
   a groove follower resiliently mounted in the sleeve to protrude within one or the other of said grooves to interrupt the sleeve movement to define a locked and an unlocked position of the probe within the cartridge well;
   a compression means mounted betwen the body and the movable sleeve to urge the sleeve toward an unlocked position.

3. A pyrotechnic detonator circuit test probe for insertion into a pyrotechnic cartridge well, said probe comprising:
   a rigid, metal tubular body;
   an outer electrical contact secured to one end of the body, being insulated therefrom by a layer of material which extends around the end of the probe toward its opposite end;
   an inner electrical contact secured inside the outer contact and separated therefrom by a sleeve of insulation;
   two electrical conductors extending axially through the body into communication with respective contacts;
   insulation moulded inside the tubular body around the electrical conductors;
   a shell secured to the exterior of the tubular body and having at least one radial aperture;
   a cam follower and retainer element reciprocably mounted within said aperture to move outward selectively beyond the outer periphery of said shell;
   a movable sleeve reciprocably mounted on the exterior of the body and having a cam surface portion exterior of the body and interior of the shell to selectively engage the cam follower and retainer element for urging it outward beyond the periphery of the shell.

4. A pyrotechnic detonator circuit test probe for insertion into a pyrotechnic cartridge well, said probe comprising:
   a tubular body;
   a pair of electrical contacts secured to the body;
   two electrical conductors communicating respectively with said contacts;
   a shell secured to said body and having at least one radial aperture;
   a cam follower and retainer element reciprocably mounted within said aperture to move outward selectively beyond the outer periphery of said shell;
   a movable sleeve secured to said body and having a cam surface portion extending into said shell to engage said cam follower and retainer element to move it outward upon predetermined movement of said sleeve;
   a pin depending from said shell into a slotted portion of said sleeve whereby upon rotating said sleeve the shell is rotated thereby.

5. A pyrotechnic detonator circuit test probe for insertion into a pyrotechnic cartridge well, said probe comprising:
   a body;
   an inner electrical contact secured in the body, said contact including an outer housing, a base secured inside the housing, a contact portion confined in the housing by a shoulder, and a compression spring extending between the base and the contact portion;
   an insulation sleeve around the exterior of the inner contact;
   an outer electrical contact secured in the body around the insulation sleeve, said outer contact including a stationary core, a stationary transverse face secured to said core and having an axial portion joined by a downwardly extending lip, a movable plate contact portion having a flange extending backward into confining engagement with said lip, and a compression means mounted between the movable plate contact and the stationary transverse face;
   a shell secured to said body and having at least one radial aperture;
   a cam follower and retainer element reciprocably mounted within said aperture to move outward selectively beyond the outer periphery of said shell;
   a movable sleeve secured to said body and having a cam surface portion extending into said shell to engage said cam follower and retainer element to move it outward upon predetermined movement of said sleeve.

6. Pyrotechnic detonator circuit test apparatus comprising:
   a pyrotechnic cartridge well having generally fixed electrical contacts;
   a body;
   a pair of electrical contacts secured to the body to engage the cartridge well contacts;

resilient means between at least one of the contacts and the body to insure satisfactory electrical connection of all contacts;

two electrical conductors communicating respectively with said contacts;

a shell secured to the exterior of said body and having at least one radial aperture;

a cam follower and retainer element reciprocably mounted within said aperture to move outward selectively beyond the outer periphery of said shell; and a movable sleeve secured to the exterior of said body and having a cam surface portion extending into the interior of said shell to engage said cam follower and retainer element to move it outward upon predetermined movement of said sleeve.

References Cited
UNITED STATES PATENTS

| | | | |
|---|---|---|---|
| 2,565,572 | 8/1951 | Pangborn | 285—168 |
| 2,757,351 | 7/1956 | Klostermann | 339—177 |
| 2,853,690 | 9/1958 | Madison | 339—45 |

MARVIN A. CHAMPION, Primary Examiner

J. H. McGLYNN, Assistant Examiner

U.S. Cl. X.R.
285—316; 339—177